Patented Nov. 3, 1925.

1,560,297

UNITED STATES PATENT OFFICE.

JOSEPH V. MEIGS, OF MONTCLAIR, NEW JERSEY, ASSIGNOR, BY MESNE ASSIGNMENTS, TO ELLIS-FOSTER COMPANY, A CORPORATION OF NEW JERSEY.

OXIDIZING ORGANIC BODIES.

No Drawing.     Application filed April 4, 1919. Serial No. 287,441.

*To all whom it may concern:*

Be it known that I, JOSEPH V. MEIGS, a citizen of the United States, and a resident of Montclair, in the county of Essex and State of New Jersey, have invented certain new and useful Improvements in Oxidizing Organic Bodies, of which the following is a specification.

This invention relates to a method of oxidizing organic bodies by regulated or selective combustion, in order to produce therefrom products of value in the arts. The invention is especially directed to the selective combustion of aromatic and hydroaromatic compounds particularly hydrocarbons and is also applicable to the treatment of other bodies including oxygenated bodies such as the cresols and their homologues and the cruder forms, such as coal tar creosote, coal tar and the like.

Under ordinary conditions of combustion the union of oxygen with bodies such as aromatic hydrocarbons is attended with the formation of large quantities of carbon dioxide and the complete or practically complete destruction of the organic body. In the present invention as indicated it is an object to secure a selective or partial combustion of the organic body so that oxidation may progress up to a certain point and be arrested at that stage. For example, if it is desired to produce benzaldehyde by the oxidation of toluol it is necessary to arrest the oxidation after one oxygen atom has entered the organic molecule. Furthermore this oxygen should enter the side-chain in order to secure the aldehydic grouping. Since benzaldehyde, in comparison with toluol is not a highly stable product it is obvious that once it is formed its destruction is very likely to ensue unless the control of conditions of oxidation are such that it is either immediately removed from the field of reaction as formed or is maintained under conditions which tend to hold this substance intact.

As combustion in free space is very difficult to control, the process of the present invention is carried out through the aid of catalytic material which not only overcomes the objection of combustion in free space but permits of an acceleration of the reaction under temperatures which may be maintained much lower than could be carried out with free space combustion. Even with catalytic material of approved character the oxidation takes place with the development of so much heat that the products produced by oxidation, oftentimes, (as indicated in the case of benzaldehyde,) being relatively sensitive, undergo changes forming tars and resins or burning completely to carbon dioxide and water. The production of tars and resins leads to deposits on the catalytic material clogging it and reducing its activity. In the present invention, preferred objects which may be attained are the control of the temperature of the operation, an elongation of the zone of active catalytic action, a means of maintaining catalytic material in a porous substantially clean condition and a means of utilizing the heat of reaction in preparing the material for oxidation or otherwise.

For the purpose of controlling the temperature of the reaction steam is preferably employed in accordance with the present invention to effect the desired control. The steam may be introduced as such in the form of ordinary wet steam or superheated steam or it may be introduced as water with the other materials and subsequently vaporized prior to or during the reaction. The effect of steam on the temperature is noteworthy. For example, in producing benzaldehyde from toluol if air is used in about the proportion required to convert the toluol to benzaldehyde the temperature of the catalytic mass quickly rises to a red heat or even a white heat resulting in the case of readily fusible or volatile catalyzers in the fusion or volatilization of the catalyzer, either of which phenomena result in cessation or serious diminution of catalytic activity.

The following data is given as showing the melting points, and in some cases the volatility of the compound.

Antimony oxides:

$Sb_2O_3$ melts at red heat (Van Nostrand's Chemical Annual, Olsen, 4th Issue, 1918).

$Sb_2O_5$ melts at 450° C. (Van Nostrand).

$Sb_2O_3$ is also volatile at a red heat (Dict. of Applied Chemistry, Thorpe, Vol. I, 1913 Edition).

Molybdenum oxides:
MoO$_3$ melts at 791° and readily volatilizes in the air (Thorpe, Vol. III).
Vanadium oxide V$_2$O$_5$ melts at 658° (Thorpe, Vol. V).
Arsenic oxides:
As$_2$O$_5$ melts at red heat (Thorpe, Vol. I).
As$_2$O$_3$ melts at 200° and is readily volatile (Thorpe, Vol. I).
Bismuth oxides:
Bi$_2$O$_5$ melts at 150° (Van Nostrand).
Bi$_2$O$_3$ melts at 820° (Van Nostrand).
Tungsten oxide WO$_3$ melts at red heat (Van Nostrand).
Selenium oxide SeO$_2$ melts at 390° (Van Nostrand).
Tellurium oxide TeO$_2$ melts at dull redness (Van Nostrand).
Chromium oxides:
CrO$_3$ melts at 196° (Van Nostrand).
CrO$_2$ melts at 300° in oxygen (Van Nostrand).

In a sintered mass containing more or less charred organic material the catalytic activity is of course arrested and the operation has to be stopped. By using a considerable excess of toluol say 3 to 10 times greater than corresponds to the air introduced, it is possible to smother the reaction thereby reducing the temperature to an operative stage under some conditions but with the possibility always of clogging the catalyzer with carbonaceous material. On the other hand when using a great excess of air to control the temperature violent fluctuations may occur and the catalyzer may become sintered at one point and active at another point producing irregularities of operation which are undesirable. When using steam these objectionable features do not obtain but a uniform and controllable reaction is obtained without detriment to the catalyzer, enabling readily fusible or volatile catalyzers to be employed for a considerable period of time without material deterioration.

Thus for example, when passing a mixture of toluol and air over a suitable finely divided catalyzer at a reacting temperature the heat developed causes a progressive increase in the temperature and usually a temporary contraction of the zone of combustion. Soon the temperature is far above the point at which a satisfactory yield of benzaldehyde can be obtained. On admission of steam the temperature immediately responds and the zone of catalytic activity is lengthened in a desirable manner. Thus for example it may be doubled in length by the introduction of a moderate amount of steam. The proportion of steam employed depends upon various factors such as size of apparatus employed but ordinarily a quantity of steam ranging between one-fifth to ten times the amount of toluol employed may be admitted. The temperature of the catalytic mass should be registered by means of a pyrometer or other device and steam admitted in accordance with the immediate requirements. Such temperature control by means of steam may be made automatic through the agency of thermostatic devices.

As an example of the method of obtaining benzaldehyde from toluol in accordance with this invention the following illustration is given.

Toluene is continuously fed into a chamber maintained at 200–250° C. where it is thoroughly mixed with air somewhat in excess of the quantity necessary to oxidize the toluol to benzoic acid. The chamber, or carburetting device is also equipped so that it is supplied with saturated or superheated steam. The mixture of toluene and air is then passed into a catalytic chamber, the details of which vary somewhat with the physical state of the catalytic material employed. Preferably the catalytic material is in the form of porous particles or granules, in which case the catalytic chamber is a vertical shell or tube, in which the gaseous materials enter at the top pass through the catalytic mass and out at the bottom.

The depth of the catalytic mass varies with the size of the particles composing it. With particles of 10–20 mesh the effective depth is approximately three inches and is proportionately greater as the size of the particles is increased. When metal is used as the catalytic material, this may take the form of screens, one or more being used according to circumstances.

The reaction is started by heating the catalytic material to 200–300° C. or higher and passing the mixture of toluene and oxygen-containing gas through the catalytic material. An exothermic reaction then commences, causing the temperature of the catalyzer and reacting substances to rise.

Steam is now admitted to the carburetting device and thoroughly mixed with the toluene vapor and oxygen containing gas, in such quantities that the temperature of the reacting substance preferably does not rise above 500° C. and preferably so that there is not more than two per cent of CO$_2$ in the exit gases from which the steam has been removed.

The quantity of steam necessary to control the reaction is, as stated, in general, from one-fifth to ten times the quantity of toluene used. The quantity of steam necessary can be diminished by utilizing the uncondensed exit gases, chiefly nitrogen and excess oxygen, to dilute the toluene-air mixture in the carburettor.

The products of the reaction, after leaving the catalytic chamber pass through a condenser into a large well cooled receiver and then through a scrubbing device where they are washed with an oil which is a solvent for benzaldehyde e. g. refined petroleum oil of suitable boiling point range.

A circulating pump takes the exit gases from the scrubbers and returns them in such quantities as may be required together with fresh quantities of oxygen-containing gas, to the carburettor. Thus the operation becomes continuous.

The product obtained from the receiver and scrubbers is chiefly a mixture of toluol and benzaldehyde with small quantities of benzoic acid.

The process may be carried out with catalyzers of various descriptions but preferably one containing chromium or iron or compounds of these elements are employed. The following illustrates various types of catalyzers which have been advantageously used in carrying out various modifications of the present process and are well adapted to be utilized in organic combustion reactions employing steam as a controlling and accelerating agent.

With the control of the temperature of the catalytic material and the reacting substances, preferably by means of the internal cooling which is one of the features of the present invention the various unitary oxides and mixtures of oxides may be used to advantage, of which the following are examples: oxides of chromium, iron, copper, nickel, antimony, bismuth, molybdenum, tungsten, uranium, and vanadium.

However, certain innovations in catalytic material for carrying out the present invention, which have for their object first to guarantee the catalyst against sintering or volatilization and hence prolong the life of the catalyst indefinitely and secondly, by the selection and combination of certain differently acting catalysts, to increase the yield of valuable oxidation products are disclosed herein.

To accomplish the first object viz, to produce a non-sintering, infusible non-volatile catalyst yet one which is admirably suited to accomplish the object of this invention, the procedure may be as follows: A suitable oxygen salt, which has for its acidic constituent, an element which can exist in more than one stage of oxidation, is prepared. For example, for the acidic constituent of the preferred catalyzer, the metallic elements of the fifth, sixth and seventh periodic group are suitable, viz. vanadium, niobium, tantalum, antimony, bismuth, chromium, molybdenum, tungsten, uranium and manganese.

For the basic constituent of the preferred catalyzer with which is combined the acidic constituent the following metals are most suitable: copper, silver, gold, zinc, titanium, tin, cerium, lead, thorium, iron, nickel, and cobalt.

Among these catalytic preparations the following will serve as illustrations of the general methods described above.

"Parts by weight" and "parts by volume" as herein used are intended to imply the same relation which exists between grams and cubic centimeters or between kilograms and litres.

1. Preparation of iron-vanado-chromate (and iron chromate as an intermediate step).

Reagents:

|  | Parts. |
|---|---|
| $FeCl_3.6H_2O$ _____ by weight__ | 100 |
| Water _____ | 100 |

Solution I: Added ammonia (sp. gr. 0.90), 90 volumes. Redissolved the resulting ppt. of $Fe(OH)_3$ in nitric acid (sp. gr. 1.40).

Solution II:

|  | Parts. |
|---|---|
| $(NH_4)_2Cr_2O_7$_____by weight__ | 111.6 |
| Water _____ | 600 |

Solutions I and II are mixed and evaporated to dryness. Toward the latter part of the evaporation the mass assumes a sort of colloidal pasty consistency and evolves large quantities of gas and fumes which causes the dry product to be in a highly vesiculated and very active condition. The resulting mass consists of ferric chromate. This mass after crushing to form grains or parts of a suitable size may be used directly as a catalyst or converted to ferric-vanado-chromate as follows:

|  | Parts. |
|---|---|
| Ferric chromate prepared as above (by weight) _____ | 20 |
| $NH_4VO_3$_____ | 10 |
| Formic acid_____by volume__ | 10 |
| Water sufficient to make a paste. |  |

The whole is well mixed in the form of a paste and evaporated to dryness. It is then strongly heated until an exothermic reaction takes place, accompanied by the evolution of so much heat that the mass is raised to incandescence.

After cooling, the resulting iron-vanado-chromate is ready for disposition in the catalytic chamber.

The second innovation in the preparation of catalytic material for carrying out the purpose of the present invention consists in using a combination of an active unitary oxide or mixture of oxides, as previously described in this description, or of an active salt consisting of a basic oxide chemically combined with an acidic oxide, as also described above, with a metallic substance capable of acting as a dehydrogenating catalyst in order further to assist in the removal of hydrogen from organic bodies and in this way to assist in the oxidation of these bodies at as low a temperature as practicable. These metallic substances may consist of metals of the platinum or palladium groups or they may consist of metals such as silver, copper, nickel and the like. The oxides and oxygenated salts described above may be considered to be "oxygen-supplying catalysts" that is, they act as "oxygen-activating catalysts" whereas substances like silver, copper, platinum and the like act as dehydrogenating catalysts. Each exerts its own specific action and the innovation consists in the combination of the two, whereby yields of valuable products in excess of the yields obtained by the use of either type of catalyst alone may be secured. In this connection a consideration of the probable mechanism of the oxidation of such a body as toluene, for example, is of interest. The course of the reaction may follow one of the following series of reactions.

Series I.

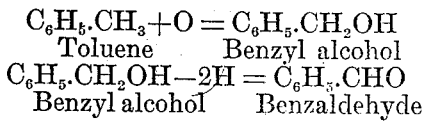

$$C_6H_5.CH_3 + O = C_6H_5.CH_2OH$$
Toluene        Benzyl alcohol
$$C_6H_5.CH_2OH - 2H = C_6H_5.CHO$$
Benzyl alcohol     Benzaldehyde Series II.

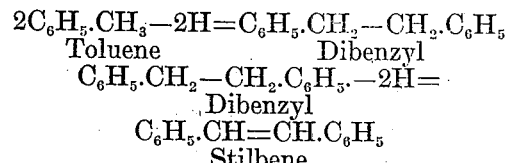

$$2C_6H_5.CH_3 - 2H = C_6H_5.CH_2 - CH_2.C_6H_5$$
Toluene            Dibenzyl
$$C_6H_5.CH_2 - CH_2.C_6H_5 - 2H =$$
Dibenzyl
$$C_6H_5.CH = CH.C_6H_5$$
Stilbene

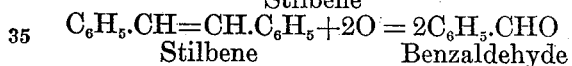

$$C_6H_5.CH = CH.C_6H_5 + 2O = 2C_6H_5.CHO$$
Stilbene            Benzaldehyde

In both series the removal of hydrogen as well as the fixation or absorption of oxygen is to be expected, and one form of the invention consists, as stated, to be in helping to facilitate this removal of hydrogen by means of dehydrogenating catalysts in the presence of oxygen and the "oxygen activating catalyst" described above. Following is a description of the preparation of such a combination of catalysts namely, iron-vanado-chromate plus metallic silver.

|  | Parts. |
|---|---|
| Iron-vanado-chromate (described above) | 28 |
| AgNO₃ crystals | 15 |
| Water | 30 |

The silver nitrate was dissolved in the water and the iron-vanado-chromate catalyst thoroughly impregnated with the solution of silver nitrate. The mass was dried, then placed in the catalytic chamber and reduced with hydrogen at about 100° C. The reduction to metallic silver by this means takes place very rapidly.

The use of steam as the essential controlling and accelerating agent does not preclude the application of other means to modify the temperature such as the employment of an excess of toluol or other organic compound treated or the introduction of inert gases or any other suitable means. For example, the gaseous products of combustion may be returned to the catalyzer chamber and air admitted in a predetermined manner to control the reaction. If the amount of water vapor present in these gases is insufficient, steam may be added as required.

A feature of operation in one embodiment of the invention involves the utilization of at least some portion of the heat of the reaction in at least one of two ways. This feature may be employed in vaporizing the toluol or other organic compound treated, or in preheating the air or producing steam. For example the organic material and air, steam and the like may be admixed in a sort of carburetting device which is placed in contact with the catalytic chamber in such a manner that the heat is transferred from the latter to the former thereby vaporizing the organic material and if desired preheating the other materials employed. Furthermore it is possible to arrange the apparatus so as to secure a regenerative effect which has a desirable cooling action on the catalytic mass not in most cases sufficient to control the temperature within the limits desired especially if apparatus of large size were used, but serving to utilize a portion at least of the waste heat of the reaction. Thus the air, or air and steam with or without the vapors of toluol or other organic substance employed may be passed about the vessel containing the catalytic mass or through tubes extending through the latter so as to secure a preheating and regenerative effect. Thus if the catalyzer is placed in a vertical shell or tower the vapors to be preheated may be passed through a jacket surrounding the latter or through tubes placed vertically or horizontally in the catalytic mass or through a coil therein or in any other suitable manner.

For best results as a general rule the temperature of the reaction should not exceed a low red, one in fact which is barely visible in a darkened room. This varies somewhat with the body under treatment but in any event it will be observed that the control of combustion in this manner through a large mass of catalyzer is very difficult by means of any external cooling devices and hence in large scale operation the use of steam offers many advantages in that it enables internal cooling to be carried out throughout the entire zone of catalytic action in an effective manner. Steam has another advantage in that it may be condensed readily and separated as water from the condensed organic bodies, many of which are insoluble therein. On the other hand fixed gases carry away a considerable amount of the substance which is being treated especially if the latter is fairly volatile. In some cases this entrained material may be removed by scrubbing with oil or similar liquid but in other cases a mist may form which is neither condensible or readily removed by washing and hence causes difficulty in recovery. Consequently it is desirable in most cases to keep the amount of fixed gases leaving the apparatus down to a low point. Steam has shown itself to be useful in this case because it appears to have a favorable effect on the amount of carbon dioxide formed. In one case without the use of steam the percentage of carbon dioxide in the issuing gases was about 16% and after the introduction of steam only 3%. The yield of benzaldehyde was simultaneously doubled. Since each volume of carbon dioxide produced is equivalent to 5 volumes of air introduced into the apparatus which in many cases may have done no useful oxidizing work it will be seen that the application of steam for reduction of the carbon dioxide content is of importance in producing a compound of the nature of benzaldehyde which in its preparation from toluol, if accompanied by no side reactions, would yield no carbon dioxide whatsoever.

There are conditions under which substantially no oxidation of toluene takes place. One is a low concentration of toluene in a large concentration of inert gas, such as $CO_2$, nitrogen, etc. This is a condition to be found in the catalyzer mass during the progress of the reaction. The toluene is partly burned to $CO_2$, leaving a smaller amount of toluene and the $O_2$ is largely consumed leaving $CO_2$ and nitrogen predominating. Hence this low concentration of toluene in $CO_2$ and nitrogen form an inactive mixture which goes on unchanged.

The more we reduce the amount of $CO_2$ thus formed, the more we tend toward keeping a higher concentration of toluene vapor and a higher concentration of $O_2$ and this tends toward more complete oxidation of the toluene, especially to form benzaldehyde.

The complete combustion of one mol. of toluene requires 9 mol. of oxygen and correspondingly 5 times this volume of air according to the following equation:

$$C_7H_8 + 18O = 7CO_2 + 4H_2O.$$

Whereas, the formation of benzaldehyde from toluene requires per mol. of toluene only one mol. of oxygen and 5 times this volume of air, according to the following equation:

$$C_7H_8 + O_2 = C_7H_6O + H_2O.$$

It is easy to see that starting with a given quantity of toluene and a corresponding given quantity of oxygen or air, in order to obtain the best yield of benzaldehyde, it is vital to prevent as much as possible the combustion of the toluene to $CO_2$ and $H_2O$.

When the reaction takes place merely by means of air and toluene and catalyzer it has been observed that the reaction soon heats the catalyzer to such a point that combustion of toluene or other organic body takes place producing sometimes as much as 16% of $CO_2$ in the waste gases.

Under these conditions the reaction is confined to a very small volume or depth of catalytic space. This is on account of the large amount of $CO_2$ formed by the combustion or destruction of the toluene and also on account of the large amount of oxygen consumed in destroying the toluene by burning it to $CO_2$ and $H_2O$ completely. As a result the product of the concentration of toluene multiplied by the concentration of oxygen becomes suddenly so low that the reaction takes place in a relatively very small catalytic space. The effective depth or length of catalyzer may be doubled by introducing steam into the air, hydrocarbon mixture at the same time reducing the amount of $CO_2$ in the waste gases to say 3% or so.

While the process has been described especially in connection with toluol I may apply it to other hydrocarbons such as xylene, cumene, pseudo cumene, cymene, indene, hydrindene, mesitylene, ethyl benzene, diethyl benzene, ethyl isopropyl benzene, dihydro xylene, dibenzyl, stilbene, tolane, camphene, ditolyl methane, naphthalene, methyl naphthalene, phenanthrene, anthracene, methyl anthracene and the like. The oxidation of cymene is of special interest, forming terephthalic acid, while the oxidation of naphthalene forms phthalic anhydrid.

The invention moreover may be employed for further oxidizing an extensive series of bodies already oxygenated and in addition to the cresols and creosotes which have been referred to above the following substances may be treated, the toluic acids, the oxy toluic acids, the xylenols, the ethyl phenols, the dioxy toluenes, the methyl naphthols, orcin, xylorcin, anethol, phenetol, benzil, cumenol, pseudo cumenol, phenol, resorcin, quinone, coal tar and pitch, resins and resin oils, turpentine, rosin spirits, pine oil, gilsonite oils and cracked distillates, and the like.

What I claim is:—

1. In the catalytic oxidation of an organic aromatic body, mixing the vapor of the organic body with an oxygen-containing gas, an internal gaseous cooling agent and a gaseous accelerating agent and subjecting the whole to the action of a vesiculated catalytic agent containing iron oxid combined with an acidic oxid of a metal, at between 200° C., and a red heat, and maintaining the $CO_2$ in the exit gases at not above 3%.

2. In the catalytic oxidation of cymene mixing the cymene vapor with an oxygen-containing gas and with steam in such amount as to keep the $CO_2$ in the exit gases at not above 3% and subjecting the whole at a temperature between 200° C., and a red heat capable of inducing oxidation of the organic body, to the action of a catalyst comprising a compound of an acidic oxid of a metal included within the fifth, sixth and seventh groups of the periodic system with a basic oxid of a metal which in the cold does not readily decompose water, such metal being included in first, second and fourth groups of the periodic system, such catalyst being in the form of granules which are themselves porous.

3. In the catalytic oxidation of an organic body in the vapor state, mixing the vapor of the organic body with an oxygen-containing gas, steam and an inert vapor and subjecting the whole to the action of a catalyst containing iron-vanado-chromate, at between 200 and 500° C.

4. In the catalytic oxidation of an organic body in the vapor state, mixing the vapor of the organic body with an oxygen-containing gas and subjecting the whole to the action of a vesiculated catalyst containing an iron chromate compound at a temperature between 200° and 500° C.

5. In the catalytic oxidation of an aromatic body in the vapor state, mixing the vapor of the aromatic body with an oxygen-containing gas and subjecting the whole to the action of a catalyst comprising an iron oxid associated with an oxid of chromium at a temperature above 200° C., but not above a red heat.

6. In the catalytic oxidation of cymene in the vapor state, mixing the vapor of cymene with an oxygen-containing gas and an internal gaseous cooling agent and causing the gas mixture to flow while at between 200 and 500° C., in contact with a vesiculated catalyst comprising a chromate compound of iron.

7. In the catalytic oxidation of cymene in the vapor state, mixing the vapor of cymene with an oxygen-containing gas and an internal gaseous cooling agent and causing the gas mixture to flow while in contact with a hot catalyst containing an iron-vanado-chromate.

8. In the catalytic oxidation of an aromatic body in the vapor state, mixing the vapor of the aromatic body with an oxygen-containing gas and an internal gaseous cooling agent and subjecting the mixture to the action of a catalyst containing chromium oxid and metallic silver at a temperature above 200° C.

9. In the catalytic oxidation of cymene in the vapor state, mixing vapor cymene with an oxygen-containing gas and an internal gaseous cooling agent and subjecting the mixture to the action of a catalyst containing chromium oxid and another metal oxid, and containing a dehydrogenating metal catalyst, while at a temperature above 200° C., but below bright redness.

10. A process of effecting catalytic oxidations which comprises introducing a mixture comprising an aromatic organic compound in the form of a gas mixed with an oxygen-containing gas, into a mass of chromate catalyzer containing metallic silver, at between 200 and 500° C.

JOSEPH V. MEIGS.